United States Patent
Konstantakopoulos et al.

(10) Patent No.: US 10,419,954 B1
(45) Date of Patent: Sep. 17, 2019

(54) TWO STAGE CLUSTERING OF WIRELESS ACCESS POINTS

(71) Applicant: Cisco Technology, Inc., San Jose, CA (US)

(72) Inventors: Ioannis Konstantakopoulos, Albany, CA (US); Rajesh S. Pazhyannur, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/950,321

(22) Filed: Apr. 11, 2018

(51) Int. Cl.
| | |
|---|---|
| H04W 4/00 | (2018.01) |
| H04L 12/28 | (2006.01) |
| H04W 24/02 | (2009.01) |
| H04W 24/10 | (2009.01) |
| H04W 16/18 | (2009.01) |

(52) U.S. Cl.
CPC .......... H04W 24/02 (2013.01); H04W 16/18 (2013.01); H04W 24/10 (2013.01)

(58) Field of Classification Search
CPC ...... H04W 24/02; H04W 16/18; H04W 24/10
USPC ...... 370/252–254, 230–236.2, 395.2–395.21
See application file for complete search history.

(56) References Cited

U.S. PATENT DOCUMENTS

| | | | |
|---|---|---|---|
| 7,333,998 B2 | 2/2008 | Heckerman et al. | |
| 8,731,623 B2 * | 5/2014 | Park | H04W 68/08 455/574 |
| 9,003,157 B1 * | 4/2015 | Marshak | G06F 3/0685 711/170 |
| 9,525,540 B1 * | 12/2016 | Shellhammer | H04L 7/0012 |
| 9,648,110 B2 * | 5/2017 | Kotecha | H04L 67/141 |
| 9,794,900 B2 * | 10/2017 | Wu | H04W 56/0005 |
| 10,003,388 B2 * | 6/2018 | Yilmaz | H04B 7/024 |
| 2004/0028003 A1 * | 2/2004 | Diener | H04L 1/0001 370/319 |
| 2009/0224957 A1 * | 9/2009 | Chung | G01S 5/0009 342/29 |
| 2012/0027111 A1 * | 2/2012 | Vook | H04B 7/0452 375/267 |

(Continued)

OTHER PUBLICATIONS

"Cisco Digital Network Architecture Center User Guide", Release 1.1, first published Dec. 5, 2017, www.cisco.com, pp. 1-100.

(Continued)

Primary Examiner — Thai D Hoang
(74) Attorney, Agent, or Firm — Edell, Shapiro & Finnan, LLC

(57) ABSTRACT

A network controller automatically identifies and addresses low performance access points (APs) by obtaining performance data of the APs that associates each AP with a performance metric. The controller clusters the first data points into a first set of groups based on the performance metric, and determines a length of time each AP is associated with each group to generate a second set of data points. The controller clusters the second data points into a second set of groups based on the percentage of time each AP is associated with each of the first set of groups. Each group in the second set of groups associates each AP with a relative performance level. The controller selects one of the second groups as a low performance group based on the relative performance level. The controller identifies a configuration change, and automatically executes the configuration change on the low performance APs.

20 Claims, 9 Drawing Sheets

(56) References Cited

U.S. PATENT DOCUMENTS

| | | | |
|---|---|---|---|
| 2013/0064165 A1* | 3/2013 | Chen | H04W 56/0045 370/312 |
| 2014/0254390 A1 | 9/2014 | Ansley et al. | |
| 2015/0146812 A1* | 5/2015 | Chu | H04B 7/0417 375/267 |
| 2016/0242153 A1* | 8/2016 | Chen | H04L 5/0098 |
| 2018/0309560 A1* | 10/2018 | Tang | H04L 5/0005 |

OTHER PUBLICATIONS

"Cisco Digital Network Architecture Center User Guide", Release 1.1, first published Dec. 5, 2017, www.cisco.com, pp. 101-200.
"Cisco Digital Network Architecture Center User Guide", Release 1.1, first published Dec. 5, 2017, www.cisco.com, pp. 201-244.
H. Cardot, et al., "A fast and recursive algorithm for clustering large datasets with k-medians", Computational Statistics and Data Analysis, Elsevier, 2012, pp. 1434-1449, HAL Id: hal-00644683, https://hal.archives-ouvertes.fr/nal-00644683, Nov. 17, 2011, 30 pages.

* cited by examiner

TWO STAGE CLUSTERING OF WIRELESS ACCESS POINTS

TECHNICAL FIELD

The present disclosure relates to detecting issues in wireless network access points.

BACKGROUND

Troubleshooting enterprise network infrastructure, such as wireless access points, typically requires determining a list of access points that perform below expectations. Unsatisfactory performance may be due to high client onboarding failures, high interference, or poor coverage. The performance of a given access point may be determined both by the Key Performance Indicator (KPI) associated with events, as well as the frequency of the events. In other words, the performance of an access point spans a KPI dimension and a time dimension. Each dimension of performance and the threshold for acceptable performance is likely to change with different venues, customers, use patterns, and network equipment. Any predetermined set of thresholds is unlikely to accurately determine the performance level of a deployed network in all of the potential configurations.

DESCRIPTION OF EXAMPLE EMBODIMENTS

Overview

In one embodiment, a computer-implemented method is provided for a network controller to automatically identify and address low performance access points of a wireless network. The method includes obtaining data associated with the performance of a plurality of access points of a wireless network. The data comprises first data points associating each particular access point of the plurality of access points with a corresponding performance metric at a particular time. The method also includes clustering the first data points into a first plurality of groups based on the performance metric to associate each particular access point in the plurality of access points with a corresponding group of the first plurality of groups at the particular time. The method further comprises determining a length of time each particular access point is associated with each group in the first plurality of groups to generate second data points. The second data points indicate a percentage of an overall time interval that each particular access point is associated with each corresponding group of the first plurality of groups. The method comprises clustering the second data points into a second plurality of groups based on the percentage of the overall time interval each particular access point is associated with each corresponding group in the first plurality of groups. Each group in the second plurality of groups associates each particular access point with a relative performance level. The method also comprises selecting a low performance group from the second plurality of groups based on the relative performance level. The low performance group comprises one or more low performance access points. The method further comprises identifying one or more access point configuration changes to increase the performance metric of at least one corresponding low performance access point of the one or more low performance access points. The method also comprises automatically executing the one or more access point configuration changes on the at least one corresponding low performance access point to improve the performance metric associated with the corresponding low performance access point.

Example Embodiments

The techniques described herein provide for a system that automatically learn the performance thresholds for the local environment, and be able to adapt performance thresholds in varying conditions. The system learns the thresholds for underperforming access points in an automatic/unsupervised manner, and clusters the performance data in the two dimensions of performance to determine which access points to address in order to improve the performance of the network. The system further determines an appropriate configuration change and automatically applies the configuration change to the underperforming access points.

Figure 1:
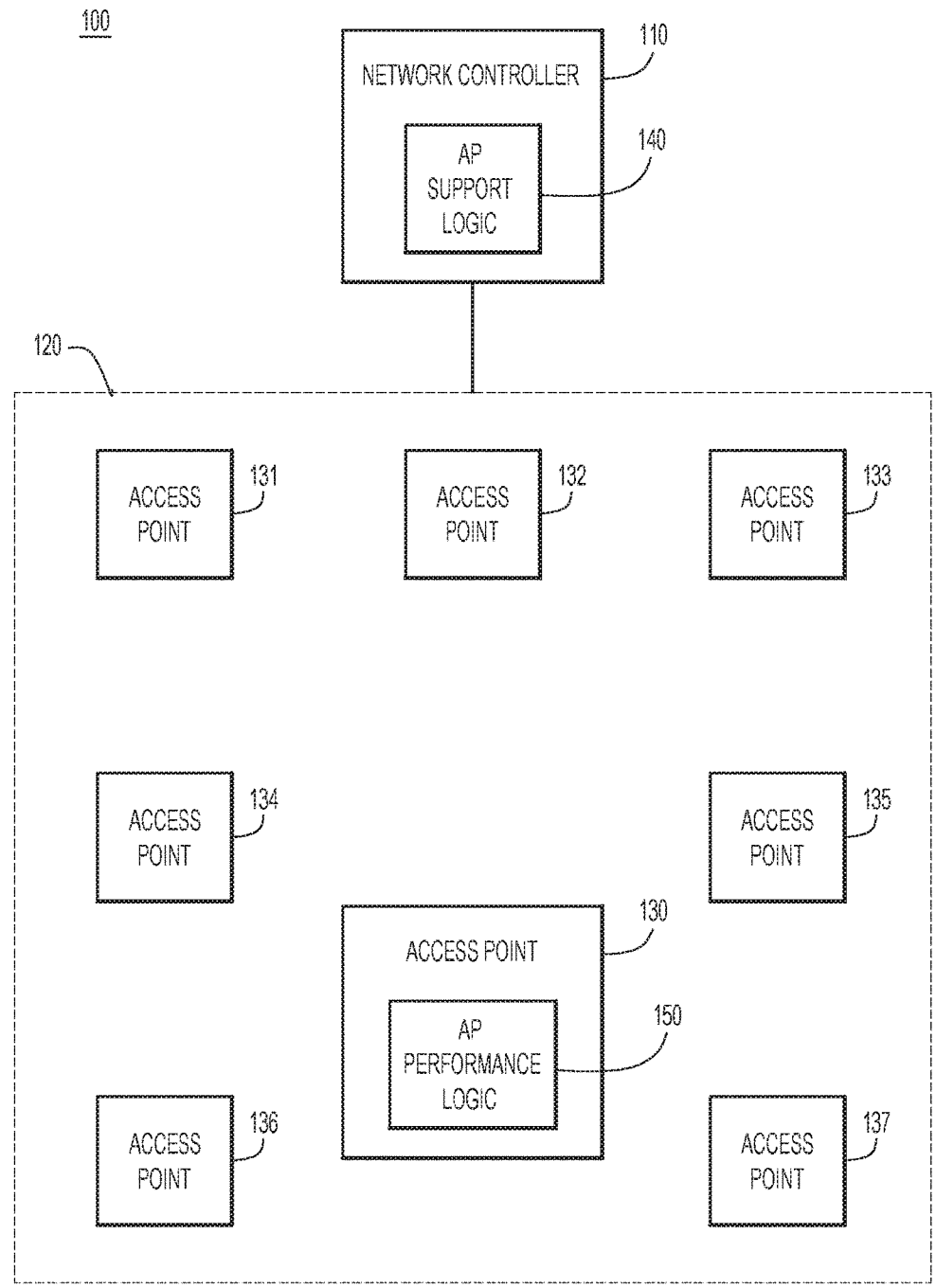
FIG. 1 is a simplified block diagram of a system for automatically detecting sub-optimal performance in access points of a wireless network, according to an example embodiment.

Referring now to FIG. 1, a network system 100 is shown that is configured to automatically identify which access points are underperforming under varying operating conditions, and automatically determine and implement configuration changes to the underperforming access points. The system 100 includes a network controller 100 that is configured to manage a wireless network 120. The wireless network 120 includes a plurality of access points 130-137 that are arranged to cover a specific location (e.g., a building, a campus, etc.). The network controller 110 includes access point (AP) support logic 140 that enables the network controller to configure the network 120 and monitor the performance of the access points 130-137 in the network 120.

The access point 130 includes AP performance logic 150 that provides performance data (e.g., onboarding success/ failure, interference, etc.) to the network controller 110. The other access points 131-137 in the network 120 may also include similar AP performance logic. In one example, the AP performance logic 150 maintains a time series that captures every client attempt to connect with the AP 130. For instance, each connection attempt may generate a data point that includes a time of the attempt, onboarding status (e.g., success or failure in getting a client to a Run state) of the attempt, and an AP identifier (e.g., the Media Access Control (MAC) address of the AP), as well as other parameters (e.g., client MAC address, wireless channel, Signal-to-Noise Ratio (SNR), Received Signal Strength Indication (RSSI), etc.). In general, each data point includes a time value, an AP identifier, and a performance metric (e.g., onboarding status, SNR and/or RSSI indicating high interference or poor coverage, etc.)

The network controller 110 is configured (e.g., through the AP support logic 140) to collect the data points from each of the access point 130-137 in the network 120 and process the data points to identify underperforming access points that may be improved with a configuration change. The process will be described hereinafter with respect to client onboarding success as a performance metric, but similar processes may be applied to improve other performance metrics, such as interference rate, or coverage area.

Figure 2:
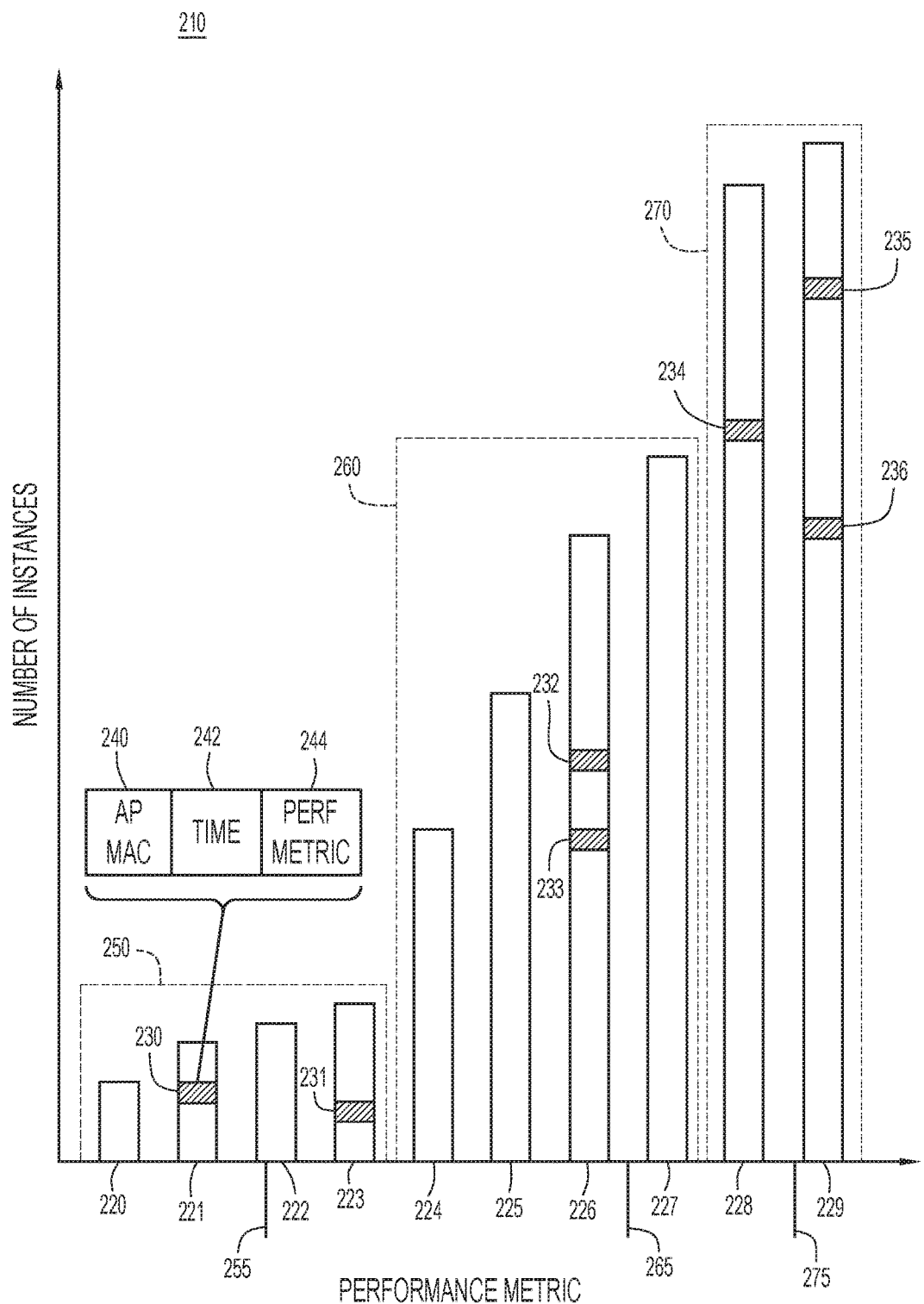
FIG. 2 is a histogram graph illustrating a first clustering of performance data into a first plurality of groups, according to an example embodiment.

Referring now to FIG. 2, a histogram graph 210 plots the data points collected from all of the access points in a network based on the associated performance metric (e.g., onboarding success). Each of the bars 220-229 in the histogram 210 represents the total number of data points that fall into a specific range of the performance metric. For instance, the bar 220 may represents the number of data points, collected from any access point, for which the performance metric falls in the bottom/first decile, i.e., below 10% of the maximum value of the performance metric. Similarly, the bars 221, 222, 223, 224, 225, 226, 227, 228, and 229 may represent the number of data points for which the performance metric falls in the second, third, fourth, fifth, sixth, seventh, eighth, ninth, and tenth, decile, respectively.

An example of data points collected from a particular access point is further highlighted in FIG. 2. The data points 230-236 represent data collected from a particular access point. Each data point, e.g., data point 230, includes an access point identifier 240 (e.g., the MAC address of the particular access point), the time 242 that the data point was collected, and the performance metric 244 associated with the particular access point identified by the identifier 240 during the time 242. In this example, the data point 230 indicates that this particular access point was in the second decile of performance (i.e., in bar 221) at one time. Similarly, the data point 231 indicates that this particular access point was in the fourth decile of performance (i.e., in bar 223) at another time. The data points 232 and 233 indicate that this particular access point was in the seventh decile of performance (i.e., in bar 226) at two separate times. The data point 234 indicates that this particular access point was in the ninth decile of performance (i.e., in bar 228) at one time. The data points 235 and 236 indicate that this particular access point was in the tenth decile of performance (i.e., in bar 229) at two other times.

Based on the performance metric all of the data points in the histogram 210, the network controller 110 clusters the data points into three groups: a) group 250 with a centroid 255, b) group 260 with a centroid 265, and c) group 270 with a centroid 275. The network controller 110 may cluster the data points according to any clustering algorithm, such as k-means clustering (e.g., with k=3 to generate the three centroids 255, 265, and 275), mean-shift clustering, density-based spatial clustering, expectation maximization clustering, or agglomerative clustering. The clustering algorithm returns the centroids that characterize the performance data collected from the access points. For instance, group 250 may cluster instances of low onboarding success, while groups 260 and 270 cluster instances of medium and high onboarding success, respectively. Since the data points 230-236 are spread across all of the groups, that particular access point experienced low, medium, and high onboarding success at different times.

In one example, the performance metric of a data point may represent a percentage of onboarding successes over a relatively short period of time (e.g., five minutes). In this case, data points from access points with a small number of onboarding attempts (e.g., below a predetermined threshold) may be deleted to minimize skewing the data with arbitrarily high or low percentages. For instance a single attempt that failed would generate a 0% success rate, which may skew the proper determination of groups.

Figure 3:
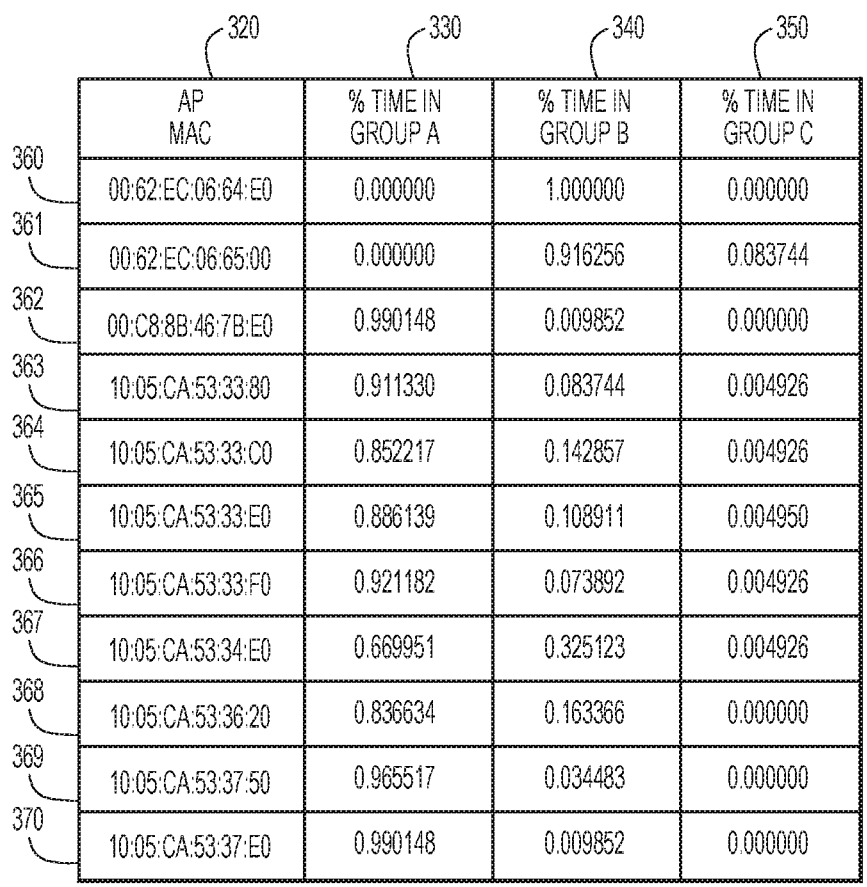
FIG. 3 is a table illustrating how long each access point is associated with each group in the first plurality of groups, according to an example embodiment.

Referring now to FIG. 3, a table 310 shows the percentage of time each AP is clustered into each group for a specific time period. The table 310 includes a column 320 of AP identifiers (e.g., MAC addresses), a column 330 of the percentage of time the AP is clustered into group A, a column 340 of the percentage of time the AP is clustered into group B, and a column 350 of the percentage of time the AP is clustered into group C. In one example, referring back to FIG. 2, group A may correspond to the high performance cluster 270, group B may correspond to the medium performance cluster 260, and group C may correspond to the low performance cluster 250. The rows 360-370 of the table 310 correspond to individual APs, and associate the AP identifier from column 320 with the percentage of time in each of groups A, B, and C, in columns 330, 340, and 350 respectively.

The row 360 corresponds to an AP with a MAC address of 00:62:EC:06:64:E0, and was clustered into group B for 100% of the specific time period. The row 361 corresponds to a different AP with a MAC address of 00:62:EC:06:65:00, and was clustered into group B for 91.6256% of the specific time period, and into group C for 8.3744% of the specific time period. The row 362 corresponds to a different AP with a MAC address of 00:C8:8B:46:7B:E0, and was clustered into group A for 91.0148% of the specific time period, and into group B for 0.9852% of the specific time period. The row 363 corresponds to another AP with a MAC address of 10:05:CA:53:33:80, and was clustered into group A for 91.1330% of the specific time period, into group B for 8.3744% of the specific time period, and into group C for 0.4926% of the specific time period.

The row 364 corresponds to another AP with a MAC address of 10:05:CA:53:33:C0, and was clustered into group A for 85.2217% of the specific time period, into group B for 14.2857% of the specific time period, and into group C for 0.4926% of the specific time period. The row 365 corresponds to another AP with a MAC address of 10:05:CA:53:33:E0, and was clustered into group A for 88.6139% of the specific time period, into group B for 10.8911% of the specific time period, and into group C for 0.4950% of the specific time period. The row 366 corresponds to another AP with a MAC address of 10:05:CA:53:33:F0, and was clustered into group A for 92.1182% of the specific time period, into group B for 7.3892% of the specific time period, and into group C for 0.4926% of the specific time period.

The row 367 corresponds to another AP with a MAC address of 10:05:CA:53:34:E0, and was clustered into group A for 66.9951% of the specific time period, into group B for 32.5123% of the specific time period, and into group C for 0.4926% of the specific time period. The row 368 corresponds to another AP with a MAC address of 10:05:CA:53:

36:20, and was clustered into group A for 83.6634% of the specific time period, and into group B for 16.3366% of the specific time period. The row 369 corresponds to another AP with a MAC address of 10:05:CA:53:37:50, and was clustered into group A for 96.5517% of the specific time period, and into group B for 3.4483% of the specific time period. The row 370 corresponds to another AP with a MAC address of 10:05:CA:53:37:E0, and was clustered into group A for 99.0148% of the specific time period, and into group B for 0.9852% of the specific time period.

In one example, network controller divides the data collected from the APs into hourly buckets. In other words, the specific time period described by the table 310 in FIG. 3 is one hour. For each hour, the network controller may collect a predetermined number of data points (e.g., twelve) from each AP, and classify each of the data points into either high performance, medium performance, or low performance. For instance, each AP may send a data point every five minutes, resulting twelve data points per AP, per hour. Alternatively, an AP may only send a data point when there is performance metric data to report, such as when a client succeeds or fails to onboard successfully. Based on the time and performance metric data collected from each AP, the network controller clusters the data points into groups based on the performance metric, and determines the length of time each AP is clustered into each group. Dividing the computed length of time by the total length of time (e.g., one hour), the network controller determines the percentages in columns 330, 340, and 350 of table 310.

Each AP is characterized by a three dimensional vector of the frequency that the AP is clustered into each group. These three dimensional vectors characterizing the percentage of time that an AP is clustered into each performance group may be plotted in a three dimensional graph to visually depict the performance of each AP. However, since the total percentage of time (i.e., the total of the value in columns 330, 340, and 350 for each row) must total 100%, the three dimensional graph may be flattened to a two dimensional graph. In other words, the percentage of time an AP is clustered into group C is defined by the percentage of time that the AP is not clustered into group A or group B. As such, the value of column 350 does not contain any more information than the combination of the values in column 330 and column 340, and the performance of each AP is well defined by a two dimensional vector.

Figure 4:
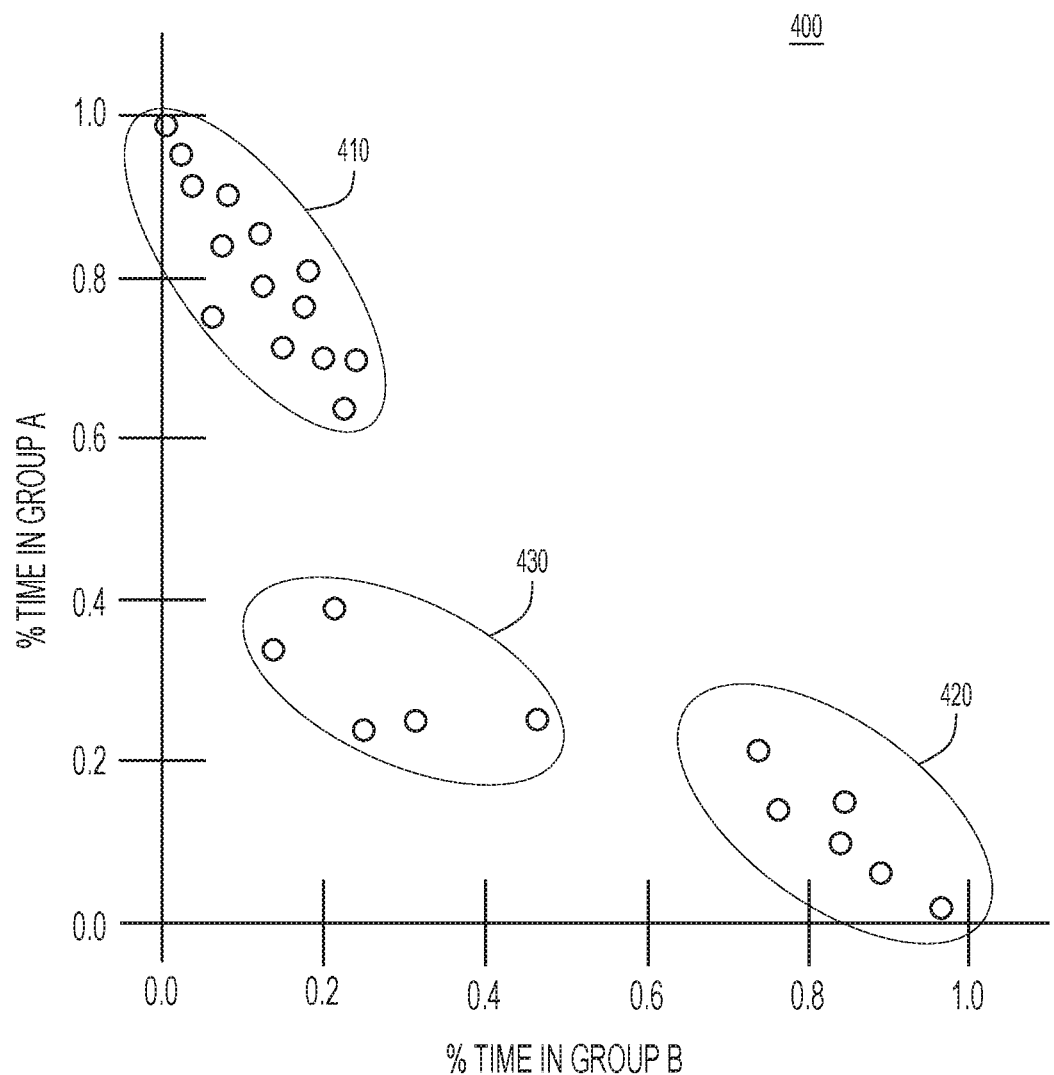
FIG. 4 is graph illustrating a second clustering of the access points based on the results of the first clustering of performance data, according to an example embodiment.

Referring now to FIG. 4, a graph 400 illustrates a second clustering of AP performance data points. The graph 400 plots two dimensional vectors (e.g., analogous to the rows of table 310 of FIG. 3) associated with each AP as a point on the graph 400. The network controller uses these two dimensional vectors as the basis for a second stage clustering of the data points associated with each AP into performance groups 410, 420, and 430. The performance group 410 includes data points associated with APs that were previously clustered into group A for a relatively large percentage of the total time. The performance group 420 includes data points associated with APs that were previously clustered into group B for a relatively large percentage of the total time. The performance group 430 includes data points associated with APs that were clustered into both group A and group B for a relatively small percentage of the total time, i.e., the APs that were clustered into group C for a relatively large percentage of the total time.

Based on the performance groups 410, 420, 430, the network controller may identify underperforming APs based on both a performance metric basis and a time basis. In one example, the network controller may identify that APs in the performance group 430 are underperforming the most, for the longest percentage of the time. The network controller may determine that one or more configuration changes would improve the performance of the APs in the performance group 430, and implement the configuration change on the identified APs in performance group 430.

In another example, the network controller may identify that APs in the performance group 410 are performing at the highest level of the APs, for the highest percentage of the time. In response, the network controller may determine a best practice AP configuration, e.g., based on common configuration aspects of the APs in performance group 410.

Figure 5A:
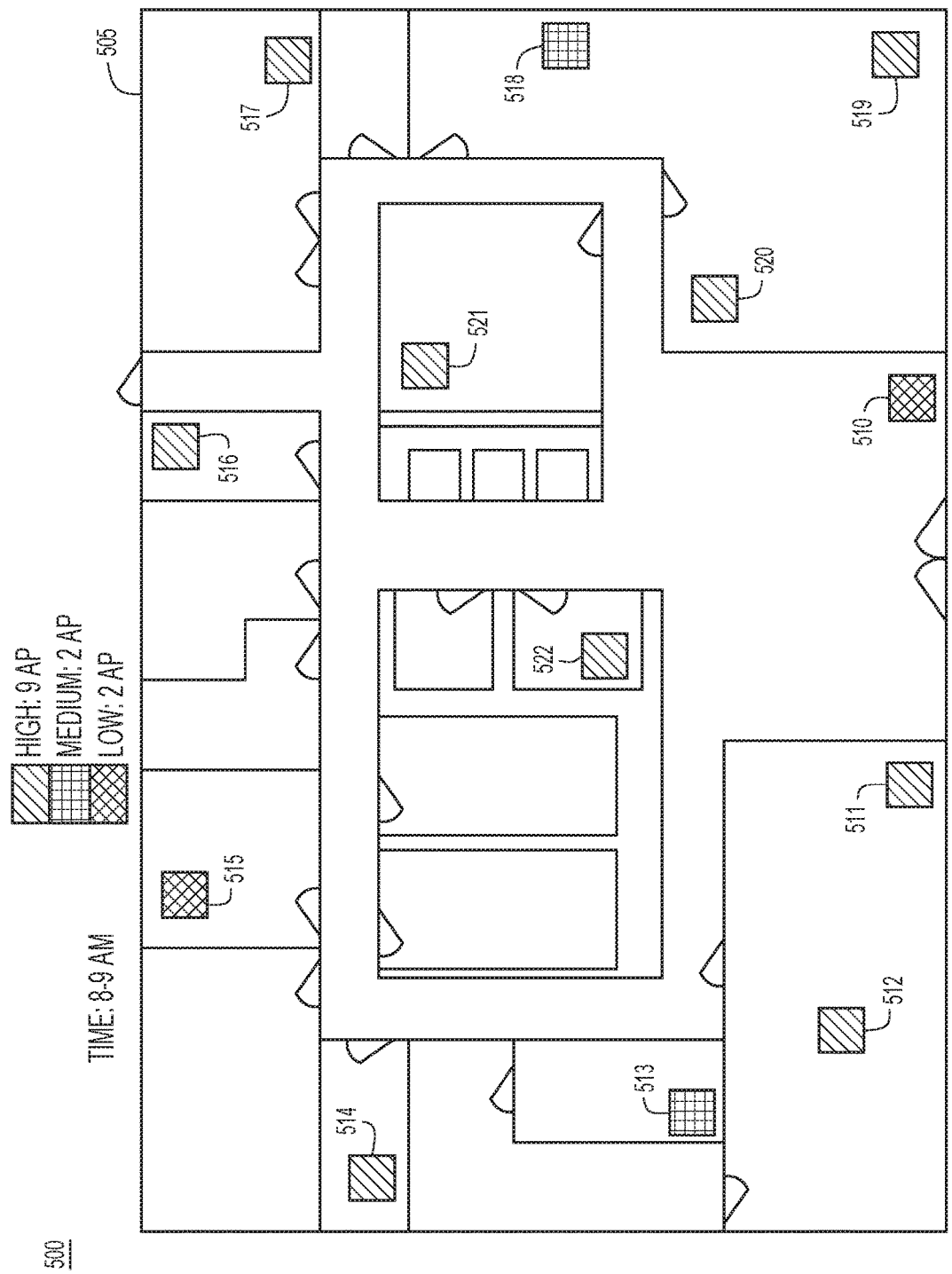
FIG. 5A illustrates performance levels of different access points in a building during a first time period, according to an example embodiment.
Figure 5B:
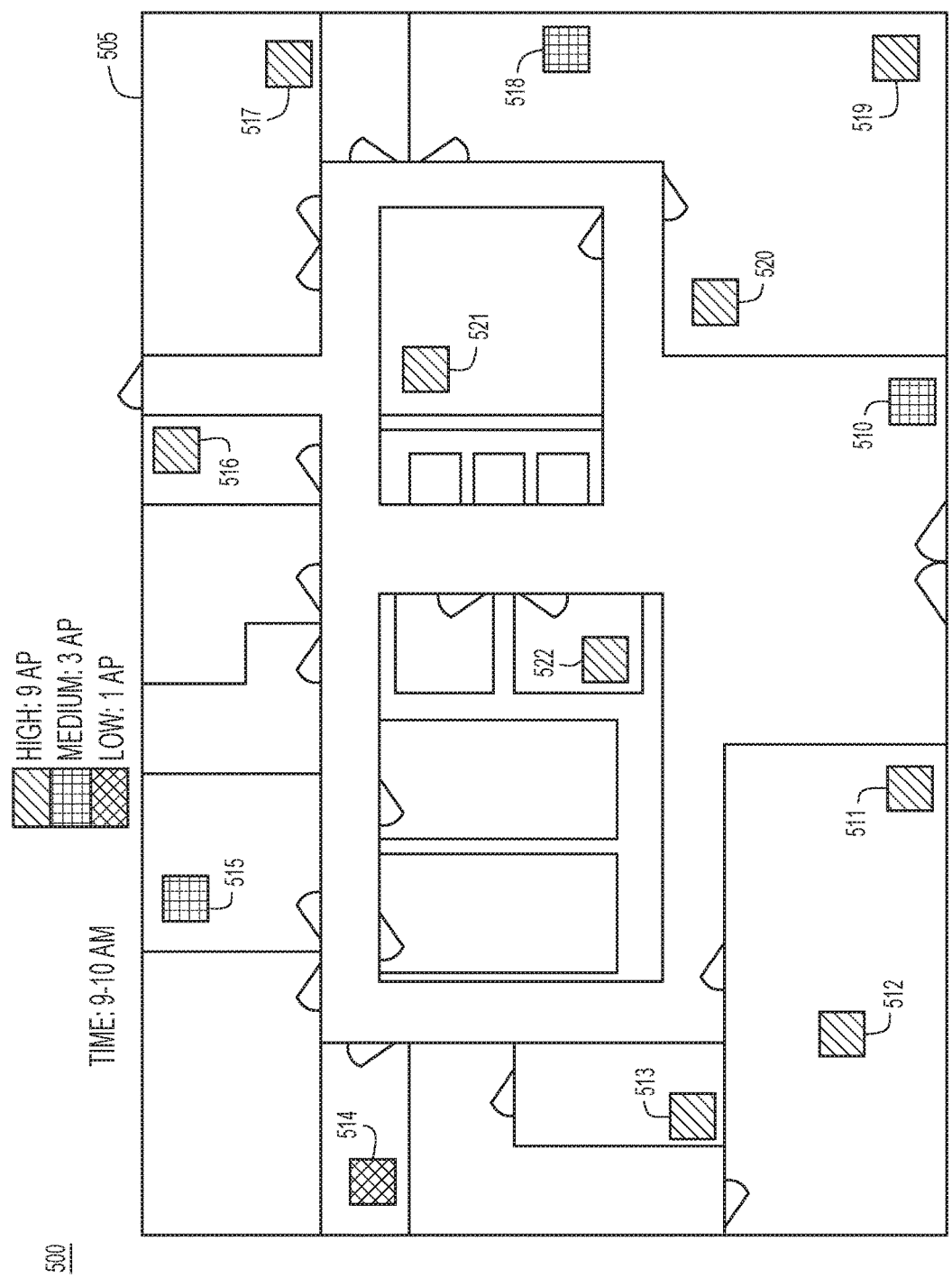
FIG. 5B illustrates performance levels of different access points in a building during a second time period, according to an example embodiment.
Figure 5C:
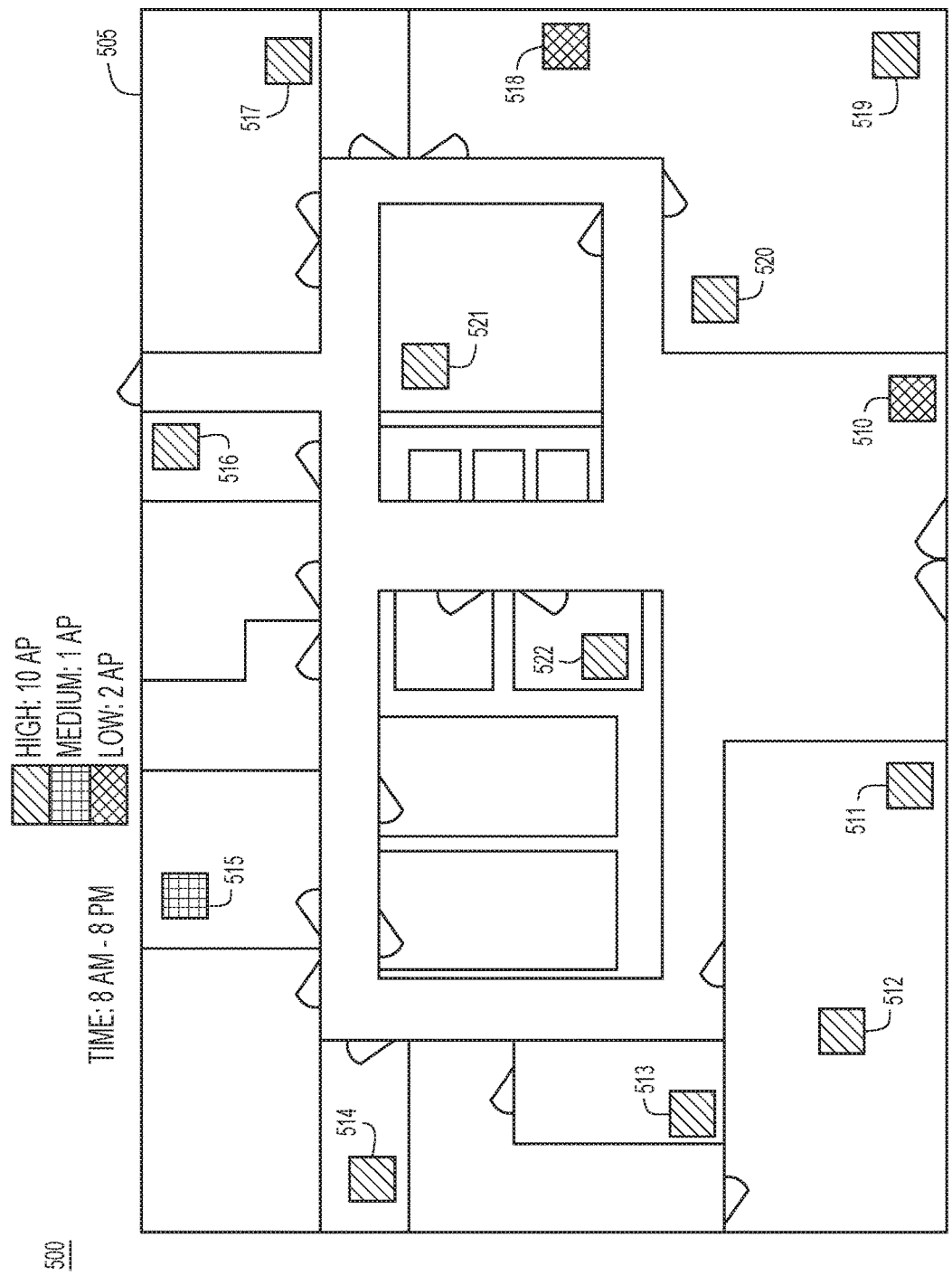
FIG. 5C illustrates performance levels of different access points in a building during a third time period, according to an example embodiment.

Referring now to FIGS. 5A, 5B, and 5C, simplified diagrams of a plurality of APs in a deployed wireless network illustrate the performance of each of the APs over specific time periods. The wireless network 500 is deployed in building 505 using APs 510-522 placed at various positions throughout the building 505. Some rooms within the building 505 may have multiple APs, such as AP 511 and AP 512, while other rooms within the building 505 rely on coverage from an AP in another room, such as AP 515. In one example, a network operator may use diagrams such as FIGS. 5A, 5B, and 5C to visualize a certain performance metric (e.g., onboarding success/failure) as a time varying entity.

Referring specifically to FIG. 5A, the performance of the APs of network 500 are analyzed for a time period of one hour, specifically 8 AM to 9 AM. In this example, nine APs (APs 511, 512, 514, 516, 517, 519, 520, 521, and 522) are clustered into a high performance group, two APs (APs 513 and 518) are clustered into a medium performance group, and two APs (APs 510 and 515) are clustered into a low performance group.

Referring specifically to FIG. 5B, the performance of the APs of network 500 are analyzed for a subsequent one hour time period, i.e., from 9 AM to 10 AM. In this example, nine APs (APs 511, 512, 513, 516, 517, 519, 520, 521, and 522) are clustered into a high performance group, three APs (APs 510, 515, and 518) are clustered into a medium performance group, and one AP (AP 514) is clustered into a low performance group. In comparison to the performance shown in FIG. 5A, some APs have been clustered into an improved performance group (e.g., APs 510 and 515). One AP has been clustered into a lower performance group (e.g., APs 514), while the other APs remain in the same performance group classification.

Referring specifically to FIG. 5C, the performance of the APs of network 500 are analyzed for a longer time period, i.e., from 8 AM to 8 PM, that includes both of the time periods shown in FIG. 5A and FIG. 5B. In this example, ten APs (APs 511, 512, 513, 514, 516, 517, 519, 520, 521, and 522) are clustered into a high performance group, one AP (AP 515) is clustered into a medium performance group, and two APs (APs 510 and 518) are clustered into a low performance group.

In each of the FIGS. 5A, 5B, and 5C, the performance groups are not tied to a predetermined performance level based on either a performance metric basis or a time basis, but are dynamically determined based on the performance metric and time basis of the entire network of APs for the time period under review. Additionally, the number of APs in each performance group is not a predetermined number or percentage of the total APs, and may be determined separately for the time period under review.

The network controller may review different time periods to determine whether a particular configuration change will improve the performance of a particular AP. For instance, the network controller may determine that an AP near the entrance of the building 505, such as AP 510, may require a configuration change to support additional bandwidth for a specific time periods. Alternatively, the network controller may determine that a particular AP (e.g., AP 518) is consistently underperforming, and may require a more permanent configuration change to improve the performance of that particular AP.

Figure 6:
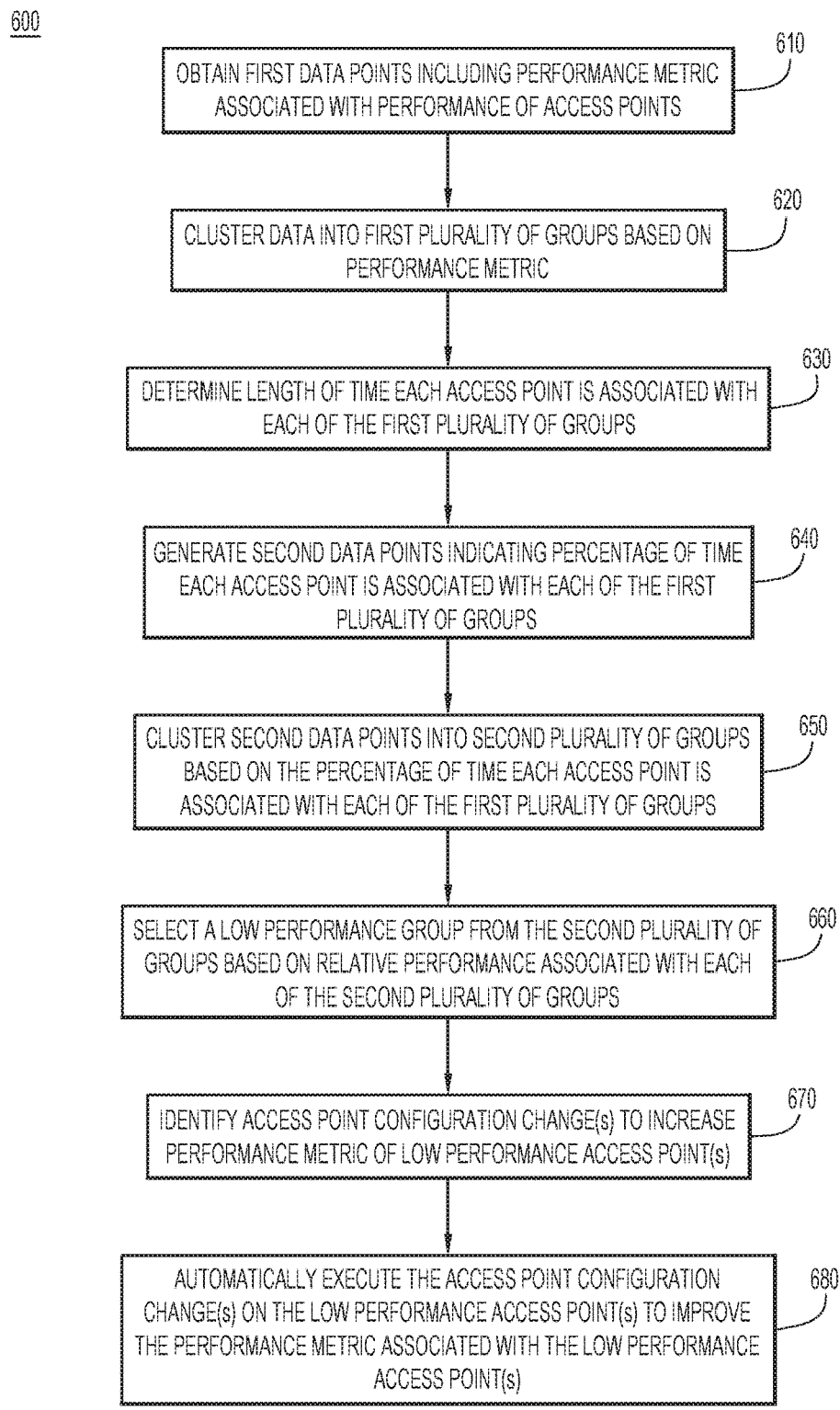
FIG. 6 is a flowchart depicting operations of a network controller in automatically determining which configuration updates for low performance access points, according to an example embodiment.

Referring now to FIG. 6, a flowchart is shown for a process 600 by which a network controller (e.g., network controller 110) identifies low performance access points and automatically executes a configuration change to improve the performance of the low performance access points. At 610, the network controller obtains data associated with the performance of a plurality of access points of a wireless network. The data comprises first data points associating each particular access point with a corresponding performance metric at a particular time. In one example, the first data points include an onboarding success/failure rate for each of the access points in the wireless network.

At 620, the network controller clusters the first data points into a first plurality of groups based on the performance metric. This first clustering associates each particular access point with a corresponding group of the first plurality of groups at the particular time. In one example, the network controller may use a k-means clustering algorithm with a predetermined number (e.g., k=3) of groups. At 630, the network controller determines how long each particular access point is associated with each group in the first plurality of groups. At 640, the network controller generates a set of second data points that indicate what percentage of the overall time interval that each particular access point is associated with each corresponding group of the first plurality of groups. For instance, the network controller may generate a second data point that indicates that a particular access point was in one of the first groups for 90% of the time, in another of the first groups for 8% of the time, and in yet another of the first groups for the remaining 2% of the time.

At 650, the network controller clusters the second data points into a second plurality of groups based on the percentage of the overall time that each particular access point is associated with each corresponding group in the first plurality of groups. Each group in the second plurality of groups associates each particular access point with a relative performance level. At 660, the network controller selects a low performance group from the second plurality of groups based on the relative performance level of the second plurality of groups. The low performance group comprises one or more low performance access points. In one example, the relative performance level combines the performance metric based group from the first clustering and the time basis of the second clustering to define a performance level that is based on both the performance metric and the amount of time the access point is associated with each performance metric.

At 670, the network element identifies one or more access point configuration changes to increase the performance metric of at least one low performance access point. In one example, the network controller may identify a configuration change that is determined to increase the performance of all of the low performance access points. At 680, the network controller automatically executes the one or more access point configuration changes on the at least one low performance access point to improve the performance metric associated with the corresponding low performance access point.

Figure 7:
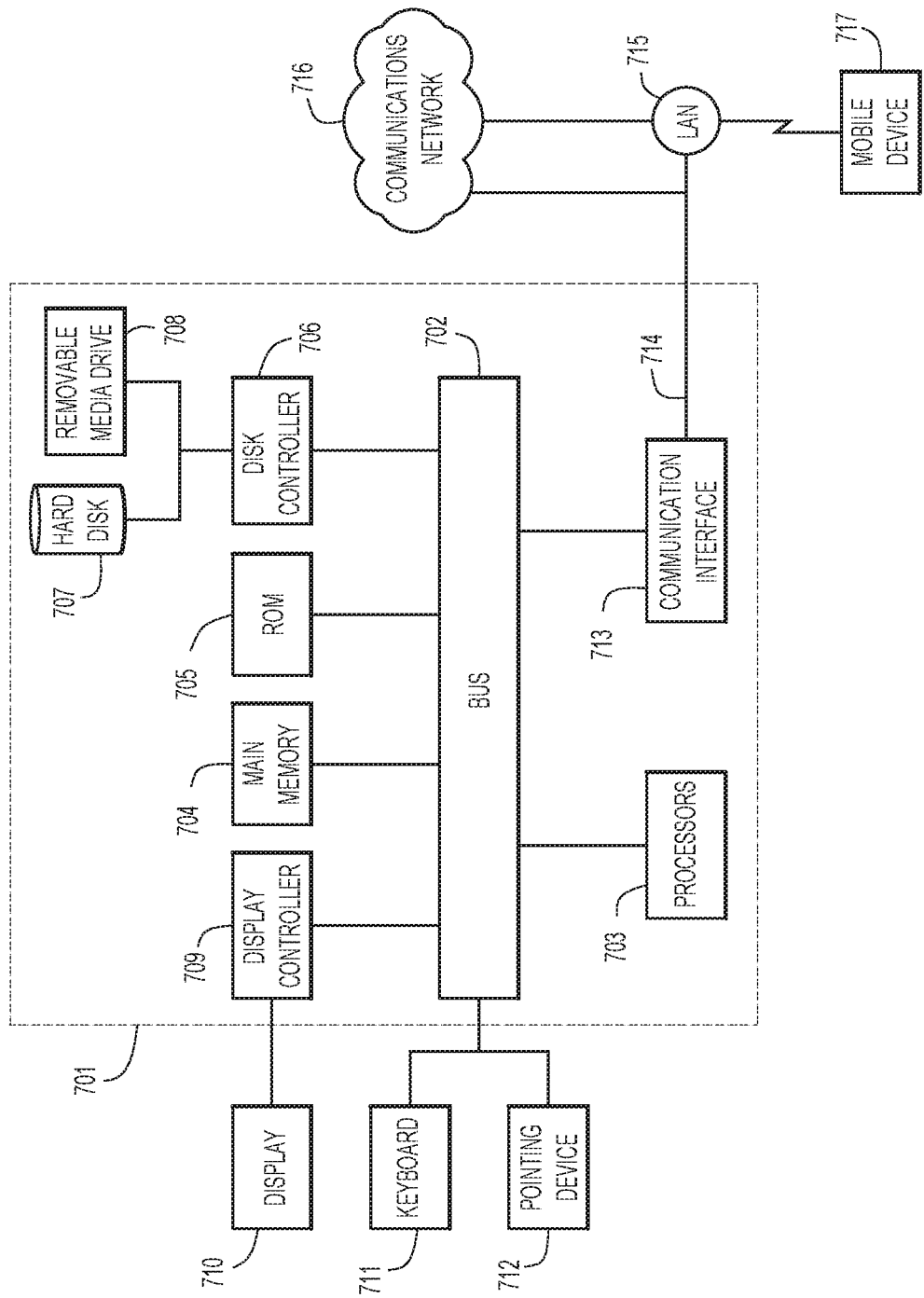
FIG. 7 is a simplified block diagram of a computing device that may be configured to perform methods presented herein, according to an example embodiment.

Referring now to FIG. 7, an example of a block diagram of a computer system 701 that may be representative of the network controller 110 in which the embodiments presented may be implemented is shown. The computer system 701 may be programmed to implement a computer based device. The computer system 701 includes a bus 702 or other communication mechanism for communicating information, and a processor 703 coupled with the bus 702 for processing the information. While the figure shows a single block 703 for a processor, it should be understood that the processors 703 may represent a plurality of processing cores, each of which can perform separate processing. The computer system 701 also includes a main memory 704, such as a random access memory (RAM) or other dynamic storage device (e.g., dynamic RAM (DRAM), static RAM (SRAM), and synchronous DRAM (SD RAM)), coupled to the bus 702 for storing information and instructions to be executed by processor 703. In addition, the main memory 704 may be used for storing temporary variables or other intermediate information during the execution of instructions by the processor 703.

The computer system 701 further includes a read only memory (ROM) 705 or other static storage device (e.g., programmable ROM (PROM), erasable PROM (EPROM), and electrically erasable PROM (EEPROM)) coupled to the bus 702 for storing static information and instructions for the processor 703.

The computer system 701 also includes a disk controller 706 coupled to the bus 702 to control one or more storage devices for storing information and instructions, such as a magnetic hard disk 707, and a removable media drive 708 (e.g., floppy disk drive, read-only compact disc drive, read/write compact disc drive, compact disc jukebox, tape drive, and removable magneto-optical drive, solid state drive, etc.). The storage devices may be added to the computer system 701 using an appropriate device interface (e.g., small computer system interface (SCSI), integrated device electronics (IDE), enhanced-IDE (E-IDE), direct memory access (DMA), ultra-DMA, or universal serial bus (USB)).

The computer system 701 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, include types of processing circuitry. The processing circuitry may be located in one device or distributed across multiple devices.

The computer system 701 may also include a display controller 709 coupled to the bus 702 to control a display 710, such as a liquid crystal display (LCD) or light emitting diode (LED) display, for displaying information to a computer user. The computer system 701 includes input devices, such as a keyboard 711 and a pointing device 712, for interacting with a computer user and providing information to the processor 703. The pointing device 712, for example, may be a mouse, a trackball, track pad, touch screen, or a pointing stick for communicating direction information and command selections to the processor 703 and for controlling cursor movement on the display 710. In addition, a printer may provide printed listings of data stored and/or generated by the computer system 701.

The computer system 701 performs a portion or all of the processing steps of the operations presented herein in response to the processor 703 executing one or more sequences of one or more instructions contained in a memory, such as the main memory 704. Such instructions may be read into the main memory 704 from another computer readable storage medium, such as a hard disk 707 or a removable media drive 708. One or more processors in a multi-processing arrangement may also be employed to execute the sequences of instructions contained in main memory 704. In alternative embodiments, hard-wired circuitry may be used in place of or in combination with software instructions. Thus, embodiments are not limited to any specific combination of hardware circuitry and software.

As stated above, the computer system 701 includes at least one computer readable storage medium or memory for holding instructions programmed according to the embodiments presented, for containing data structures, tables, records, or other data described herein. Examples of computer readable storage media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM, DVD), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 701, for driving a device or devices for implementing the operations presented herein, and for enabling the computer system 701 to interact with a human user (e.g., a network administrator). Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 701 also includes a communication interface 713 coupled to the bus 702. The communication interface 713 provides a two-way data communication coupling to a network link 714 that is connected to, for example, a local area network (LAN) 715, or to another communications network 716 such as the Internet. For example, the communication interface 713 may be a wired or wireless network interface card to attach to any packet switched (wired or wireless) LAN. As another example, the communication interface 713 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 713 sends and receives electrical, electromagnetic or optical signals that carry digital data streams representing various types of information.

The network link 714 typically provides data communication through one or more networks to other data devices. For example, the network link 714 may provide a connection to another computer through a local area network 715 (e.g., a LAN) or through equipment operated by a service provider, which provides communication services through a communications network 716. The local network 714 and the communications network 716 use, for example, electrical, electromagnetic, or optical signals that carry digital data streams, and the associated physical layer (e.g., CAT 5 cable, coaxial cable, optical fiber, etc.). The signals through the various networks and the signals on the network link 714 and through the communication interface 713, which carry the digital data to and from the computer system 701 may be implemented in baseband signals, or carrier wave based signals. The computer system 701 can transmit and receive data, including program code, through the network(s) 715 and 716, the network link 714 and the communication interface 713. Moreover, the network link 714 may provide a connection through a LAN 715 to a mobile device 717 such as a personal digital assistant (PDA), tablet computer, laptop computer, or cellular telephone.

In summary, the techniques presented herein provide for an unsupervised, data driven process to evaluate network performance, such as onboarding failure/success, across both feature space and time space. These techniques are scalable, identify performance issues across both feature space and time space, and may uniquely map performance instances for each of the network components (e.g., access points). Once the performance levels of the access points are identified, the network controller may automatically identify and implement a configuration change to improve the performance of low performing access points.

In one form, a method is provided for a network controller to automatically identify and address low performance access points of a wireless network. The method includes obtaining data associated with the performance of a plurality of access points of a wireless network. The data comprises first data points associating each particular access point of the plurality of access points with a corresponding performance metric at a particular time. The method also includes clustering the first data points into a first plurality of groups based on the performance metric to associate each particular access point in the plurality of access points with a corresponding group of the first plurality of groups at the particular time. The method further comprises determining a length of time each particular access point is associated with each group in the first plurality of groups to generate second data points. The second data points indicate a percentage of an overall time interval that each particular access point is associated with each corresponding group of the first plurality of groups. The method comprises clustering the second data points into a second plurality of groups based on the percentage of the overall time interval each particular access point is associated with each corresponding group in the first plurality of groups. Each group in the second plurality of groups associates each particular access point with a relative performance level. The method also comprises selecting a low performance group from the second plurality of groups based on the relative performance level. The low performance group comprises one or more low performance access points. The method further comprises identifying one or more access point configuration changes to increase the performance metric of at least one corresponding low performance access point of the one or more low performance access points. The method also comprises automatically executing the one or more access point configuration changes on the at least one corresponding low performance access point to improve the performance metric associated with the corresponding low performance access point.

In another form, an apparatus is provided comprising a network interface and a processor. The network interface is configured to communicate with a plurality of access points in a wireless network. The processor is coupled to the network interface and configured to obtain via the network interface, data associated with the performance of the plurality of access points of the wireless network. The data comprises first data points associating each particular access point of the plurality of access points with a corresponding performance metric at a particular time. The processor is also configured to cluster the first data points into a first plurality of groups based on the performance metric to associate each particular access point in the plurality of access points with a corresponding group of the first plurality of groups at the particular time. The processor is further configured to determine a length of time each particular access point is associated with each group in the first plurality of groups to generate second data points. The second data points indicate a percentage of an overall time interval that each particular access point is associated with each corresponding group of the first plurality of groups. The processor is configured to cluster the second data points into a second plurality of groups based on the percentage of the overall time interval each particular access point is associated with each corresponding group in the first plurality of groups. Each group in the second plurality of groups associates each particular access point with a relative performance level. The processor is also configured to select a low performance group from the second plurality of groups based on the relative performance level. The low performance group comprises one or more low performance access points. The processor is further configured to identify one or more access point configuration changes to increase the performance metric of at least one corresponding low performance access point of the one or more low performance access points. The processor is also configured to automatically execute the one or more access point configuration changes on the at least one corresponding low performance access point to improve the performance metric associated with the corresponding low performance access point.

In yet another form, one or more non-transitory computer readable storage media is encoded with software comprising computer executable instructions and, when the software is executed by a processor on a network controller, operable to cause the processor to obtain data associated with the performance of the plurality of access points of the wireless network. The data comprises first data points associating each particular access point of the plurality of access points with a corresponding performance metric at a particular time. The software is also operable to cause the processor to cluster the first data points into a first plurality of groups based on the performance metric to associate each particular access point in the plurality of access points with a corresponding group of the first plurality of groups at the particular time. The software is further operable to cause the processor to determine a length of time each particular access point is associated with each group in the first plurality of groups to generate second data points. The second data points indicate a percentage of an overall time interval that each particular access point is associated with each corresponding group of the first plurality of groups. The software is operable to cause the processor to cluster the second data points into a second plurality of groups based on the percentage of the overall time interval each particular access point is associated with each corresponding group in the first plurality of groups. Each group in the second plurality of groups associates each particular access point with a relative performance level. The software is also operable to cause the processor to select a low performance group from the second plurality of groups based on the relative performance level. The low performance group comprises one or more low performance access points. The software is further operable to cause the processor to identify one or more access point configuration changes to increase the performance metric of at least one corresponding low performance access point of the one or more low performance access points. The software is also operable to cause the processor to automatically execute the one or more access point configuration changes on the at least one corresponding low performance access point to improve the performance metric associated with the corresponding low performance access point.

The above description is intended by way of example only. Although the present disclosure has been described in detail with reference to particular arrangements and configurations, these example configurations and arrangements may be changed significantly without departing from the scope of the present disclosure.

What is claimed is:

1. A method comprising:
    at a network controller, obtaining data associated with a performance of a plurality of access points of a wireless network, wherein the data comprises first data points associating each particular access point of the plurality of access points with a corresponding performance metric at a particular time;
    clustering the first data points into a first plurality of groups based on the performance metric to associate each particular access point in the plurality of access points with a corresponding group of the first plurality of groups at the particular time;
    determining a length of time each particular access point is associated with each group in the first plurality of groups to generate second data points, the second data points indicating a percentage of an overall time interval that each particular access point is associated with each corresponding group of the first plurality of groups;
    clustering the second data points into a second plurality of groups based on the percentage of the overall time interval each particular access point is associated with each corresponding group in the first plurality of groups, wherein each group in the second plurality of groups associates each particular access point with a relative performance level;
    selecting a low performance group from the second plurality of groups based on the relative performance level, the low performance group comprising one or more low performance access points;
    identifying one or more access point configuration changes to increase the performance metric of at least one corresponding low performance access point of the one or more low performance access points; and
    automatically executing the one or more access point configuration changes on the at least one corresponding low performance access point to improve the performance metric associated with the corresponding low performance access point.

2. The method of claim 1, wherein the performance metric is a client onboarding failure rate, a radio interference level, or a poor coverage metric.

3. The method of claim 1, further comprising determining that at least one of the first data points is an outlier data point and discarding the outlier data point.

4. The method of claim 1, wherein clustering the first data points comprises k-means clustering, mean-shift clustering, density-based spatial clustering, expectation maximization clustering, or agglomerative clustering.

5. The method of claim 1, wherein clustering the second data points comprises k-means clustering, mean-shift clustering, density-based spatial clustering, expectation maximization clustering, or agglomerative clustering.

6. The method of claim 1, wherein the one or more access point configuration changes includes changing a transmission power of the corresponding low performance access point or changing a channel assignment of the corresponding low performance access point.

7. The method of claim 1, further comprising:
obtaining updated data associated with the performance of the plurality of access points; and
recursively updating the first plurality of groups, the second plurality of groups, the low performance group, and the one or more access point configuration changes.

8. An apparatus comprising:
a network interface configured to communicate with a plurality of access points in a wireless network; and
a processor coupled to the network interface and configured to:
obtain via the network interface, data associated with a performance of the plurality of access points of the wireless network, wherein the data comprises first data points associating each particular access point of the plurality of access points with a corresponding performance metric at a particular time;
cluster the first data points into a first plurality of groups based on the performance metric to associate each particular access point in the plurality of access points with a corresponding group of the first plurality of groups at the particular time;
determine a length of time each particular access point is associated with each group in the first plurality of groups to generate second data points, the second data points indicating a percentage of an overall time interval that each particular access point is associated with each corresponding group of the first plurality of groups;
cluster the second data points into a second plurality of groups based on the percentage of the overall time interval each particular access point is associated with each corresponding group in the first plurality of groups, wherein each group in the second plurality of groups associates each particular access point with a relative performance level;
select a low performance group from the second plurality of groups based on the relative performance level, the low performance group comprising one or more low performance access points;
identify one or more access point configuration changes to increase the performance metric of at least one corresponding low performance access point of the one or more low performance access points; and
automatically execute the one or more access point configuration changes on the at least one corresponding low performance access point to improve the performance metric associated with the corresponding low performance access point.

9. The apparatus of claim 8, wherein the performance metric is a client onboarding failure rate, a radio interference level, or a poor coverage metric.

10. The apparatus of claim 8, wherein the processor is further configured to determine that at least one of the first data points is an outlier data point and discard the outlier data point.

11. The apparatus of claim 8, wherein the processor is configured to cluster the first data points by k-means clustering, mean-shift clustering, density-based spatial clustering, expectation maximization clustering, or agglomerative clustering.

12. The apparatus of claim 8, wherein the processor is configured to cluster the second data points by k-means clustering, mean-shift clustering, density-based spatial clustering, expectation maximization clustering, or agglomerative clustering.

13. The apparatus of claim 8, wherein the one or more access point configuration changes includes changing a transmission power of the corresponding low performance access point or changing a channel assignment of the corresponding low performance access point.

14. The apparatus of claim 8, wherein the processor is further configured to:
obtain updated data associated with the performance of the plurality of access points; and
recursively update the first plurality of groups, the second plurality of groups, the low performance group, and the one or more access point configuration changes.

15. One or more non-transitory computer readable storage media encoded with software comprising computer executable instructions and, when the software is executed by a processor on a network controller, operable to cause the processor to:
obtain data associated with a performance of a plurality of access points of a wireless network, wherein the data comprises first data points associating each particular access point of the plurality of access points with a corresponding performance metric at a particular time;
cluster the first data points into a first plurality of groups based on the performance metric to associate each particular access point in the plurality of access points with a corresponding group of the first plurality of groups at the particular time;
determine a length of time each particular access point is associated with each group in the first plurality of groups to generate second data points, the second data points indicating a percentage of an overall time interval that each particular access point is associated with each corresponding group of the first plurality of groups;
cluster the second data points into a second plurality of groups based on the percentage of the overall time interval each particular access point is associated with each corresponding group in the first plurality of groups, wherein each group in the second plurality of groups associates each particular access point with a relative performance level;
select a low performance group from the second plurality of groups based on the relative performance level, the low performance group comprising one or more low performance access points;
identify one or more access point configuration changes to increase the performance metric of at least one corresponding low performance access point of the one or more low performance access points; and
automatically execute the one or more access point configuration changes on the at least one corresponding low performance access point to improve the performance metric associated with the corresponding low performance access point.

16. The non-transitory computer readable storage media of claim 15, wherein the performance metric is a client onboarding failure rate, a radio interference level, or a poor coverage metric.

17. The non-transitory computer readable storage media of claim 15, further comprising instructions operable to cause the processor to determine that at least one of the first data points is an outlier data point and discard the outlier data point.

18. The non-transitory computer readable storage media of claim 15, further comprising instructions operable to cause the processor to cluster the first data points by k-means clustering, mean-shift clustering, density-based spatial clustering, expectation maximization clustering, or agglomerative clustering.

19. The non-transitory computer readable storage media of claim 15, further comprising instructions operable to cause the processor to cluster the second data points by k-means clustering, mean-shift clustering, density-based spatial clustering, expectation maximization clustering, or agglomerative clustering.

20. The non-transitory computer readable storage media of claim 15, wherein the one or more access point configuration changes includes changing a transmission power of the corresponding low performance access point or changing a channel assignment of the corresponding low performance access point.

* * * * *